United States Patent
Laffler et al.

(10) Patent No.: US 8,728,221 B2
(45) Date of Patent: May 20, 2014

(54) MODIFIED WET SCRUBBER FOR REMOVAL OF AIRBORNE TONER

(76) Inventors: Donald F. Laffler, El Paso, TX (US); Lacee L. Lamphere, El Paso, TX (US); Robert Vines, Horizon City, TX (US); James T. Hardin, Corona, NM (US)

( * ) Notice: Subject to any disclaimer, the term of this patent is extended or adjusted under 35 U.S.C. 154(b) by 0 days.

(21) Appl. No.: 13/616,281

(22) Filed: Sep. 14, 2012

(65) Prior Publication Data

US 2013/0068105 A1   Mar. 21, 2013

Related U.S. Application Data

(60) Provisional application No. 61/536,030, filed on Sep. 18, 2011.

(51) Int. Cl.
*B01D 47/00* (2006.01)

(52) U.S. Cl.
USPC ........... 96/246; 96/253; 96/265; 95/19; 95/24

(58) Field of Classification Search
None
See application file for complete search history.

(56) References Cited

U.S. PATENT DOCUMENTS

| | | | | |
|---|---|---|---|---|
| 6,063,348 | A | * | 5/2000 | Hinke et al. ............... 423/235 |
| 6,138,378 | A | * | 10/2000 | Takashina et al. ............ 34/379 |
| 2007/0053803 | A1 | * | 3/2007 | Lee et al. ................. 422/168 |
| 2011/0083556 | A1 | * | 4/2011 | Duesel et al. .............. 95/158 |

* cited by examiner

*Primary Examiner* — Duane Smith
*Assistant Examiner* — Pankti Patel
(74) *Attorney, Agent, or Firm* — J. Todd Rushton

(57) ABSTRACT

A modified wet scrubber for removing airborne toner particles including, increased recirculation pumping capacity, and controlling the operating fluid level by relating the pressure differential between the inlet and outlet air streams to proper operating fluid level.

8 Claims, 3 Drawing Sheets

MODIFIED WET SCRUBBER FOR REMOVAL OF AIRBORNE TONER

This application claims priority to U.S. Provisional Application 61/536,030 filed Sep. 18, 2011, the entire disclosure incorporated by reference.

BACKGROUND

A laser printer toner cartridge recycling operation can liberate hundreds, or even thousands of pounds of spent toner per hour. Unfortunately, in most such operations, a portion of the toner becomes airborne and can be a health hazard if it is inhaled by persons, or it can be an explosion or fire hazard. For safety, it is vital that operators control these hazards. This is traditionally accomplished by high volume dry filtering of toner laden air. Modern dry air filtering systems, e.g. bag houses, have good health and safety records, but only when they are properly designed, installed and maintained. These systems consist of hoods, ducts, fans, filters, bags, etc. They are complex, expensive to build and install and they require constant vigilance and maintenance to meet required levels of safety and performance.

Wet scrubbers are an alternative means for removing airborne dust. They generally have lower capital and maintenance costs comparable bag houses. Wet scrubbers are successfully used in coal fired electrical power generation facilities to remove fly ash from exhaust gasses. They also are successfully used in many other applications however; conventional wet scrubbers do not perform well in for removing airborne laser printer toner. Still, when the reasons for their poor performance in a toner application can be identified and corrected, they offer greater margins of health and safety and lower overall cost than comparable dry filtering systems. After scrubbing, toner is removed from the operating fluid and collected as damp cake or mud. Wet toner can be safely handled and used because of its decreased ignitability and the reduced probability for an accidental fire or explosion. Finally, wet scrubbing can be easily setup as a continuous process. That is a significant advantage when wet scrubbers are part of a continuous production operation. These attributes make wet scrubbers inherently safer, as well as, more economical compared to bag houses.

Commercial wet scrubbers, suitable for collecting airborne toner, are not currently available. Conventional scrubbers collect dust in the operating fluid as sludge. These scrubbers handle dust whose density is higher than that of the operating fluid very well. However, they do not handle dust that floats, e.g. density less than that of the operating fluid, nearly so well. Low cost, non-flammable operating fluids are usually water based with specific gravities near 1.0. Toner consists mostly of low melting point plastic that has a specific gravity less than most water based operating fluids, i.e. much of the toner floats. However, toner also contains a significant amount of other higher density materials such as pigments, desiccants, ferromagnetic material, performance enhancers, etc. Thus, a successful scrubber must handle materials with densities above and below that of its operating fluid.

The engineering problem is to successfully remove high volumes of floating and sinking materials while preserving the filtering performance and the health and safety benefits of wet scrubbing. Extensive analysis, testing, design and development were required to build a satisfactory wet scrubber to meet these requirements.

SUMMARY OF THE INVENTION

This invention relates to improvements in the art of wet scrubbers to safely and economically remove over 99% (ninety nine percent) of airborne toner. The modified wet scrubber is capable of continuously removing both the floating and sinking toner materials in particle sizes down to 5 (five) microns. The invention is a modified wet scrubber capable of continuously removing airborne toner at high rates. A Whirl Wet® by Tri-Mer Corporation is modified in two important respects. First, the scrubber is modified to include a high volume pumping system that pumps the operating fluid through the scrubber at a rate sufficient to maintain all collected toner materials in suspension. The operating fluid carries the suspended materials out of the scrubber to conventional dewatering and filtering equipment where the solids are separated from the fluid. The clean operating fluid is then recycled back into the wet scrubbing process to conserve fluid and minimize any escape into the environment.

A second problem stems from the need to dynamically control the operating fluid level in a scrubber within narrow limits for optimum performance. Turbulent operating fluid flow in the scrubber and interference from floating materials make a simple fluid level sensor, as typically used in conventional scrubbers, unacceptable for this application. Analysis and testing showed that in this application, controlling the air pressure drop across the scrubber provided accurate control of the scrubber's performance. Thus, a second scrubber modification incorporated control of the operating fluid level by measuring the differential air pressure between the scrubber's air inlet and outlet and adjusting the inlet and outlet fluid flow rates to raise or lower the operating fluid level as required.

With these modifications, a wet scrubber is capable of safely and efficiently removing airborne toner materials at the required rate. The invention is implemented using commercially available components and equipment. It is configured to remove floating and sinking components of airborne toner and suspend them in the circulating operating fluid. The collected toner is maintained in suspension while being delivered to dewatering and filtering equipment where it is removed and the clean fluid is returned to the scrubber and reused. Toner is extracted as a damp cake or mud that is non-flammable and is safe to handle and process in this form.

The objective is to produce an economical, continuous airborne toner removal process for laser printer toner cartridge recycling. It is based on wet scrubber principles, where wet scrubbing replaces dry air filtering bag houses and eliminates their associated health and safety hazards and achieves further benefits by eliminating the need to handle dry, potentially explosive toner.

It is contemplated that the modifications disclosed may be applicable to other conventional wet scrubbers, including, but not limited to, cyclonic wet scrubbers and venturi type wet scrubbers. In addition, it is understood that the processes and methods described may have many yet unidentified applications and describing it for capturing airborne printer toner is for illustration purposes and is not intended to limit its utility.

These and other features and advantages of the disclosure will be set forth and will become more fully apparent in the detailed description that follows and in the appended claims. The features and advantages may be realized and obtained by the instruments and combinations particularly pointed out in the appended claims. Furthermore, the features and advantages of the disclosure may be learned by the practice of the methods or will be obvious from the description, as set for herein.

Major Processing Equipment List

For example the airborne printer toner recovery process may be accomplished by the following major processing equipment:

1. Whirl Wet® wet scrubber or other type wet scrubbers as modified
2. Pumps, and piping
3. Dewatering equipment
4. Wet filtering equipment
5. Control system consisting of logic controller, differential air pressure sensor and flow control valves

BRIEF DESCRIPTION OF THE DRAWINGS

The following description of the embodiments can be understood in light of the Figures, which illustrate specific aspects of the embodiments and are part of the specification. Together with the following description, the Figures demonstrate and explain the principles of the embodiments. In the Figures the physical dimensions of the embodiment may be exaggerated for clarity. The same reference numerals in different drawings represent the same element, and thus their descriptions may be omitted.

DETAILED DESCRIPTION OF THE INVENTION

Figure 1:
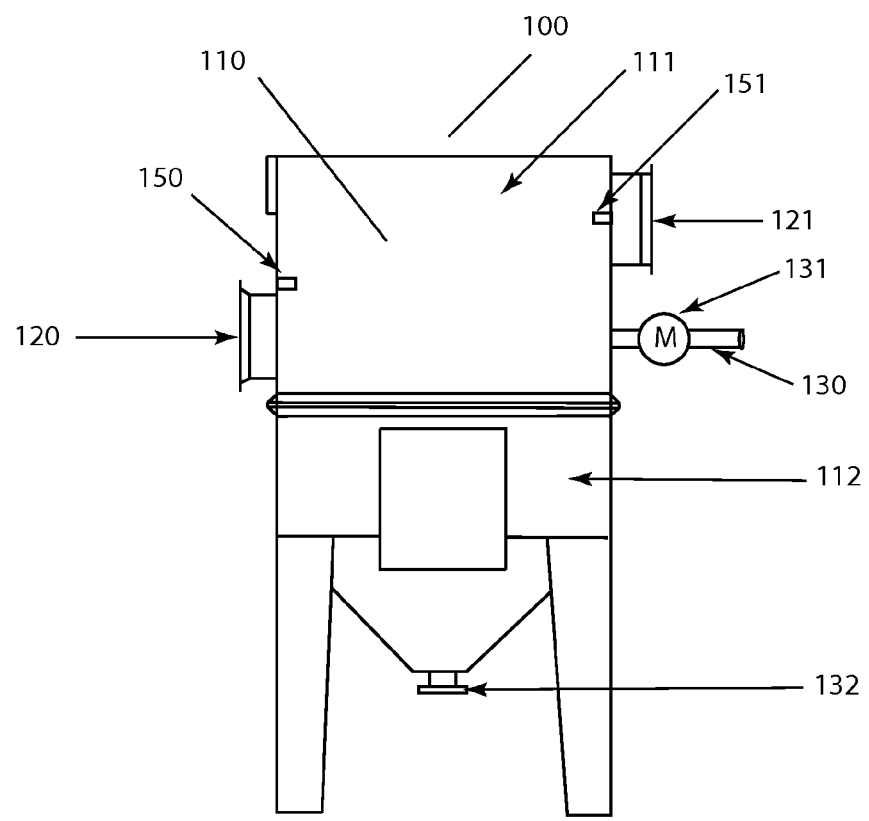
FIG. 1 illustrates a side view of a conventional wet scrubber as modified.

For the purposes of promoting an understanding of the principles in accordance with the disclosure, reference will be made to the embodiments illustrated in the drawings and specific language will be used to describe the same. It will nevertheless be understood that no limitation of the scope of the disclosures is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

As used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "characterized by," and the grammatical equivalents thereof are inclusive or open-ended terms that do not exclude additional, unrecited elements of method processes.

The disclosure relates to modifications of a Whirl Wet® wet scrubber for the removal the airborne toner liberated during the recycling process of the laser cartridges.

Figure 2:
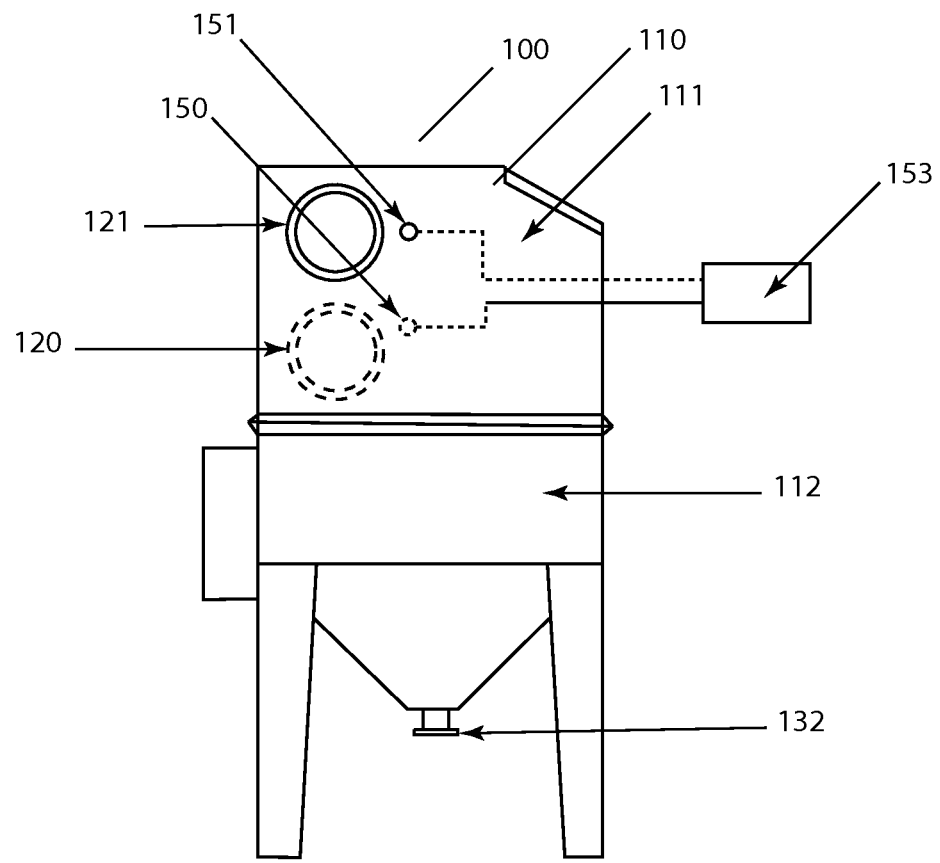
FIG. 2 illustrates a front view of a conventional wet scrubber as modified.
Figure 3:
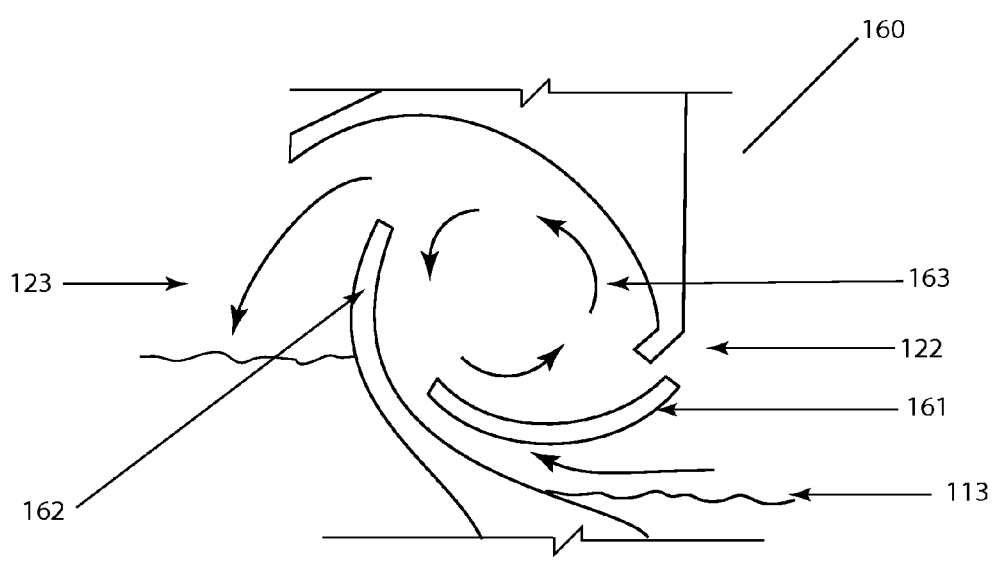
FIG. 3 illustrates the separation of particulate matter in the wet scrubber.

Illustrated in FIGS. 1 and 2 is one embodiment of the present invention or modified wet scrubber 100 for removal of airborne toner. Wet scrubber 100 includes a body portion 110 comprising an air mixing chamber 111 and process fluid reservoir 112. The air mixing chamber 111 includes an air inlet 120 and air outlet 121. The process fluid reservoir portion 112 having an optimal operating process fluid level 113 (shown FIG. 3), process fluid is introduced into the system by an injection port 130, having a servo controlled valve 131. Process fluid, with captured toner, is removed from the system through outlet 132 as a continuous flow and moved via pump to filtration (not shown). Shown in FIG. 3 is the typical coalescing blade arrangement 160 for a Whirl Wet® scrubber. The scrubber 160 having an air intake side 122, where air having entrained particles is introduced, and an air discharge side 123. Guide vanes or blades 161 and 162 form a mixing vortex 163. On the inlet side of vortex 163 clean operating fluid, typically water, is set at an optimal level 113, when air laden with toner particles are introduced into the system, the air is accelerated through the mixing vortex 163. The surface of the operating fluid is also drawn into the mixing vortex 163, where water is separated into droplets; the toner particles become entrained with the water droplets and are forced through the mixing vortex 163 to the discharge side 123. For water to be effectively drawn up into the mixing vortex the operating fluid must be maintained the optimal level 113. In a typical wet scrubber the operating fluid level is maintain using a float switch, however, in the present invention the wet scrubber 100 operating fluid level 113 is correlated to the differential air pressure measured by pressure sensors 150 and 151 (FIGS. 1 and 2) on the inlet and outlet air sides. If the air pressure differential falls below a pre-set range a process control unit will signal servo valve 131 (FIG. 1) to open and increase the flow of process fluid into wet scrubber 100. A process fluid recirculation pump (not shown) may be included in the logic of control unit 153 and used to increase the rate of draw down the process fluid. It is contemplated that modulation of draw down may be accomplished using valves or a variable frequency drive on the recirculation pump.

The invention claimed is:

1. A modified wet scrubber for removing printer toner comprising:
    a wet scrubber having an air handling portion and a operating fluid reservoir;
        the operating fluid reservoir having operating fluid;
        the air handling portion having an inlet air side and an outlet air side;
        an inlet air pressure sensor and an outlet air pressure sensor;
        the operating fluid having an optimal fluid level range;
        the fluid level in the operating fluid reservoir changing a pressure differential between the inlet air pressure sensor and the outlet air pressure sensor, and;
    a programmable logic controller that monitors the pressure differential to adjust the operating fluid level within the optimal fluid level range.

2. The modified wet scrubber of claim 1 including a high volume operating fluid pumping system.

3. The modified wet scrubber of claim 1 including an operating fluid inlet and an operating fluid outlet.

4. The modified wet scrubber of claim 3 including a servo controlled valve on the operating fluid inlet.

5. The modified wet scrubber of claim 4 wherein the servo controlled valve is opened by the programmable logic controller to add operating fluid to the operating fluid reservoir.

6. The modified wet scrubber of claim 3 including a pump attached to the operating fluid discharge.

7. The modified wet scrubber of claim 6 wherein the pump is actuated by the programmable logic controller to remove operating fluid from the operating fluid reservoir.

8. The modified wet scrubber of claim 6 wherein the pump includes a variable frequency drive to change the rate of operating fluid circulation.

* * * * *